United States Patent [19]

Kim

[11] Patent Number: 5,557,666
[45] Date of Patent: Sep. 17, 1996

[54] METHOD FOR DISPLAYING AN ABSENT-MESSAGE IN A PRIVATE EXCHANGE SYSTEM

[75] Inventor: Moon-sik Kim, Ahnyang, Rep. of Korea

[73] Assignee: SamSung Electronics Co., Ltd., Suwon, Rep. of Korea

[21] Appl. No.: 221,629

[22] Filed: Apr. 1, 1994

[30] Foreign Application Priority Data

Nov. 17, 1993 [KR] Rep. of Korea .................. 24486/1993

[51] Int. Cl.$^6$ ............................ H04M 1/64; H04M 1/21; H04M 3/42
[52] U.S. Cl. ......................... 379/201; 379/214; 379/218; 379/396; 379/354; 379/164; 379/165
[58] Field of Search ..................... 379/164, 165, 379/96, 201, 396, 354, 52, 214, 218

[56] References Cited

U.S. PATENT DOCUMENTS

| | | | |
|---|---|---|---|
| 4,658,417 | 4/1987 | Hashimoto et al. | 379/97 |
| 4,794,639 | 12/1988 | Urui et al. | 379/89 |
| 4,918,322 | 4/1990 | Winter et al. | 379/88 |
| 4,969,136 | 11/1990 | Chamberlin et al. | 379/96 |
| 4,969,182 | 11/1990 | Ohtsubo et al. | 379/67 |
| 5,029,198 | 7/1991 | Walpole et al. | 379/88 |
| 5,119,415 | 6/1992 | Aoyama | 379/207 |
| 5,138,655 | 8/1992 | Takashima et al. | 379/396 |
| 5,309,511 | 5/1994 | Kotake | 379/201 |

FOREIGN PATENT DOCUMENTS 0239756  10/1987  Japan .................... 379/201

OTHER PUBLICATIONS

Marc & Harry, Twin or Clone, Aug. 87, pp. 48–54, Teleconnect.

Primary Examiner—Jeffery Hofsass
Assistant Examiner—Parag Dharia
Attorney, Agent, or Firm—Robert E. Bushnell, Esq.

[57] ABSTRACT

A method for displaying an absence message in a private exchange system. More specifically, a method for displaying on a calling party's telephone, a message containing the reason for a called party's absence and the beginning and ending points of the absence in either a time or date format. The method is accomplished by a party registering an absence message on a keyphone, so that a reason for an absence and the period of absence will sent and displayed on variable visual display of the calling party's telephone when the party is called while absent.

19 Claims, 9 Drawing Sheets

```
┌─────────────────────┐
│   ABSENT MESSAGE    │──51
├─────────────────────┤
│                     │
└─────────────────────┘

┌─────────────────────┐
│ TIME    :  —  :     │──52
├─────────────────────┤
│                     │
└─────────────────────┘

┌─────────────────────┐
│ DATE    /  —  /     │──53
├─────────────────────┤
│                     │
└─────────────────────┘

┌─────────────────────┐
│ TIME 09:30–12:00    │──54
├─────────────────────┤
│                     │
└─────────────────────┘

┌─────────────────────┐
│ DATE 09/30–10/06    │──55
├─────────────────────┤
│                     │
└─────────────────────┘

┌─────────────────────┐
│ TIME 09:30–12:00    │──56
├─────────────────────┤
│ INTERNAL MEETING    │
└─────────────────────┘

┌─────────────────────┐
│ DATE 09/30–10/06    │──57
├─────────────────────┤
│ INTERNAL MEETING    │
└─────────────────────┘
```

*FIG. 6*

METHOD FOR DISPLAYING AN ABSENT-MESSAGE IN A PRIVATE EXCHANGE SYSTEM

BACKGROUND OF THE INVENTION

The present invention relates to a method for displaying an absence-message in a private exchange system, and more particularly, to a method for displaying to a calling party, messages concerning a reason for the absence and the period of absence of a called party when the calling party attempts to contact an absent called party ("a party" may also be referred to as a "subscriber").

Generally, in a keyphone system, when a party B is talking on the telephone with another party, say A, and an incoming call is received from another party, say C, the method for processing the message is that party B recognizes party C's call by a blinking message lamp on his telephone indicating that the current line is in a busy state. Party C then presses a message key on her telephone so that the keyphone system retains her call on hold to wait for party B to finish his current conversation. After party B finishes talking with party A, he then presses a message key and the keyphone system connects him to speak with party C. If party B is not actually on the telephone however, but rather is away from his desk, party C will have to wait for his return or call back later.

In the above scenario, it is often inconvenient and a waste of time for the calling party to continuously wait or attempt to re-call the called party. A large reason for this problem is because the calling party is unaware of the called party's period of absence. If the calling party knew the called party had been absent for a long period of time, it may suggest that a continued absence is likely, and therefore it would be unwise to wait or immediately re-call. On the other hand, if the calling party knew that the called party had been absent for only a short period of time, it may suggest that the called party had only stepped away for a moment, and therefore it would be prudent to wait or re-call within a short time. In the art there have been several attempts to provide a system that communicate messages to a calling party when a party being called is either absent or unavailable.

One earlier such attempt is disclosed in U.S. Pat. No. 5,029,198 entitled *Telephone Call Responding System and Control Method and Device Therefore* issued to Walpole, et al. In Walpole '198, a called party, upon receiving an incoming telephone call, selects one of a plurality of call response messages by actuating a control key. This activates the system to provide a synthesized speech message to the calling party which gives the caller a desired message. The disadvantages of this system, however, are that it requires the called party to be present at the time of the incoming call, and further that it provides only a voice message to the calling party. The system does not provide the caller with a visual message at his telephone. Accordingly, this system is deficient because it fails to provide a message for a called party who is absent, and also fails to provide its message in a format compatible for a visual display.

An earlier attempt at a message transferring system is disclosed in U.S. Pat. No. 4,969,182 entitled *Method of Telephone Call Wherein Status Data Inhibits Calls And Indicates To The Caller The Reason The Called Party Is Unavailable,* issued to Ohtsubo, et al. In this system, a party registers a message indicating a reason for his absence with an electronic switching unit. When an incoming call arrives for the party, the switching unit decides whether the party's telephone is available to call on the basis of the registered message. If a message has been registered by the party, a calling party is informed of the message by an audible signal or a visual display. Although this system may address some of the disadvantages associated with Walpole, et al. '198, by not requiring the called party to be present during an incoming call and by providing a visual display for the caller, it has been my observation that Ohtsubo '182 suffers from the deficiency of not supplying the caller with information regarding the called party's term of absence. Therefore, even though the calling party will know the reason for the called party's absence, I have observed that the calling party will not be aware of how long the called party has been gone or even provided with any indication of how long the absence is expected to continue. Accordingly, it would seem to me that the calling party will have no idea as to when he should attempt to call back.

A more recent also incomplete attempt at solving the above-mentioned problems is disclosed in U.S. Pat. No. 5,119,415 entitled *Method of Displaying Called Party Information On Calling Party Terminal And Communication Network Using The Method* issued to Aoyama. In this effort, a party registers a message in an exchange system. Then, when an incoming call arrives, the registered message is displayed on a terminal of the calling party. It has been my observation that the displayed message however includes only a content message and an estimated return time and that the message does not provide information regarding how long the party as been absent. Therefore, it would seem to me that if by accident or oversight, the called party fails to return by the displayed time, the caller has no other indication as to when the called party might return. For instance, if a party registers a message indicating that he will be on a "business trip" until Mar. 15, 1994, and on Mar. 17, 1994, he has not returned, a calling party may be entirely clueless as to when arrival is expected. In response, the calling party may continue to repeatedly attempt to telephone the absent party over an extended period of time in expectation of the return of the called party. Depending upon when the party actually returns, these continued attempts by the calling party may be extremely inconvenient and an extraordinary waste of time.

SUMMARY OF THE INVENTION

It is therefore, an object of the present invention to provide an improved method and apparatus for facilitating telephone communication between parties.

It is another object to provide a method and apparatus for displaying an absence-message that includes both a departing time and an estimated arrival time in a private exchange system.

It is another object of the present invention to provide a method and apparatus for displaying an absence-message that includes both a departing time and an estimated arrival time, in either a time or date format.

It is still another object of the present invention to provide a method and apparatus for displaying a message to a calling party explaining why a called party is absent.

It is still yet another object of the present invention to provide a method and apparatus for displaying a message to a calling party indicating when the calling party should attempt to call a called party back again.

It is further a object of the present invention to provide a method and apparatus for displaying messages to a calling party to prevent the calling party from wasting time waiting for a called party to respond to the call.

To achieve these and other objects, the present invention contemplates enabling a party to register an absence message indicating both the reason for the absence and the term of the absence (in either a time or date format), detecting whether an absence message has been registered when an incoming call is received, and of transferring the absence message to be displayed on a variable visual display (hereinafter assumed to be a liquid crystal display, i.e. LCD) of a calling party's telephone when the absence-message is registered.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a diagram showing the format of the absence-message according to the present invention when it is registered on an LCD display.

DETAILED DESCRIPTION OF THE PREFERRED EMBODIMENT

In the following description, specific details are set forth to provide a more thorough understanding of the present invention. It will be apparent, however, to one skilled in the art, that the present invention may be practiced without these specific details. In other instances, well-known circuits have not been described to not obscure the present invention.

Figure 1:
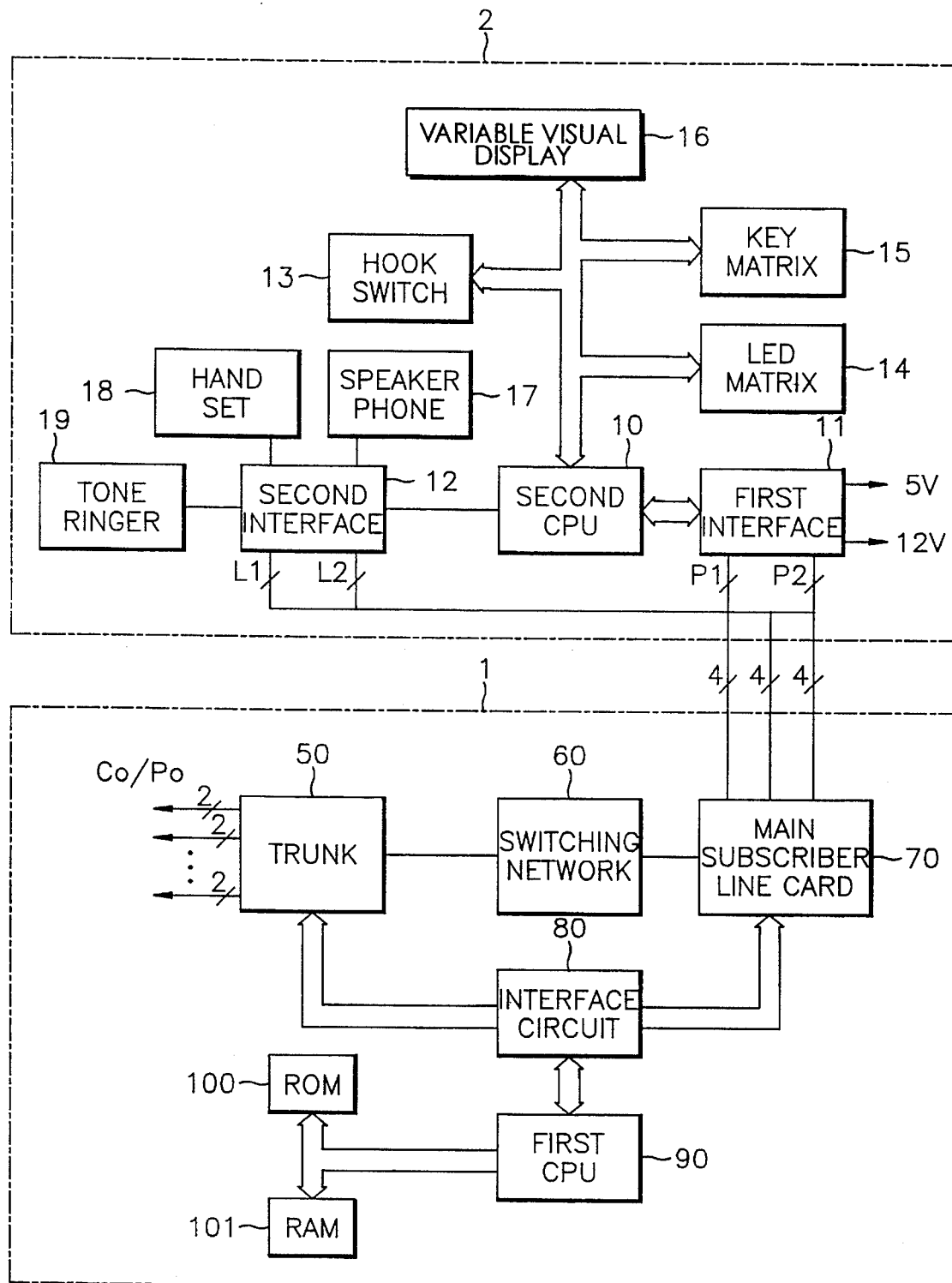
FIG. 1 is a block diagram of a general keyphone system.

FIG. 1 shows a block diagram of a general keyphone system. In this system, a main apparatus 1 includes: a read only memory (ROM) 100 having a program for performing keyphone functions and providing constant service data; a random access memory (RAM) 101 for temporarily storing processed data used within the system; a first central processing unit (CPU) 90 for controlling speech switching and performing system operations; a main subscriber line card 70 having a button and a display device and being connected to the keyphone to transmit control signals to up to six different lines; a trunk 50 connected to an office line to provide ring detection, an outgoing pulse and excess-voltage protection, and also to compensate for switching loss; and an interface circuit 80 to provide smooth input and output of control data to and from first CPU 90, trunk 50, a switching network 60 and the main subscriber line card 70. Also, a sub-apparatus 2 includes: a second central processing unit (CPU) 10 for controlling a speech circuit by processing commands according to a key input, for displaying outgoing calls and for processing data that is transferred and received; a first interface circuit 11 for transferring power and data to the main subscriber line card 70 of the main apparatus 1; a second interface 12 for transferring a voice signal to the main subscriber line card 70 of the main apparatus 1; a key matrix 15 connected to the second CPU 10 for receiving dial and key inputs; a hook switch 13; an LED (light emitting diode) matrix 14 for displaying a key input state of the key matrix 15; a hand set 18 connected to the second interface circuit 12 used as a means to orally communicate over the telephone; a speaker-phone 17 enabling a user to speak over the telephone while the telephone is in a hook-on state; a tone finger 19 for generating a ring signal; and an LCD display 16 for displaying messages, such as another party's extension number, an office line number, a busy message, a hold message, a reservation and a terminating rejection.

Figure 2:
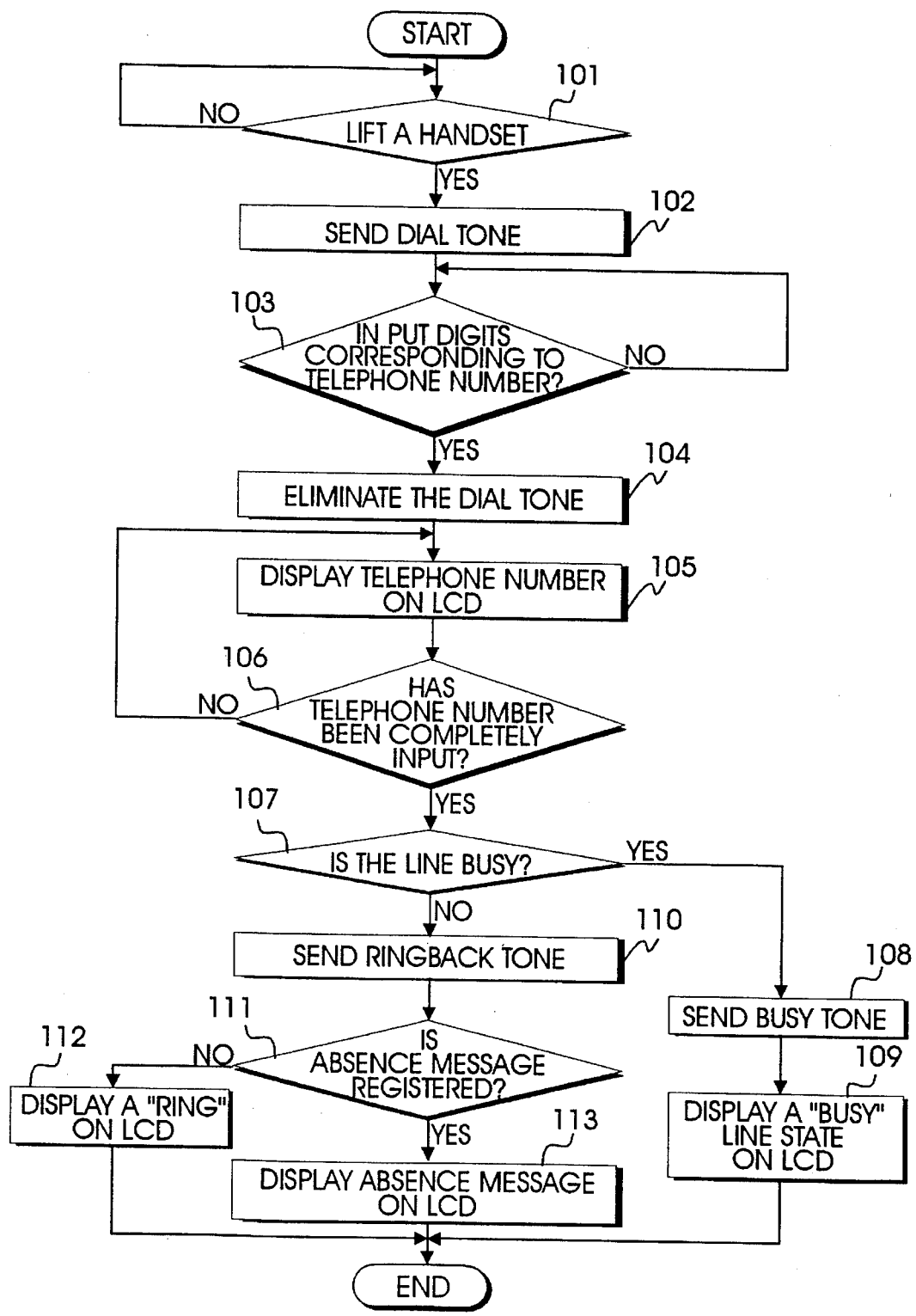
FIG. 2 is a flow chart showing a method for displaying an absence-message in a conventional keyphone system.

FIG. 2 is a flow chart showing a method for displaying the absence-message in a conventional keyphone system. The following description for displaying the absence-message in the conventional keyphone system, refers to FIGS. 1 and 2.

In step 101, when a calling party lifts the handset 18, the first CPU 90 of the main apparatus 1 receives data indicating a hook-off state through the second interface 12 of the sub-apparatus 2, the main subscriber line card 70 and the interface circuit 80. Once received, the hook-off signal is transferred to second CPU 10 through the interface circuit 80, the main subscriber line card 70 and the first interface 11. In a step 102, first CPU 90 of the main apparatus 1 enables the calling party to hear a dial tone through interface circuit 80, main subscriber line card 70, the first interface 11 and the handset 18. In a step 103, the first CPU 90 checks whether digits corresponding to the telephone number of the called party are input by the calling party. In step 104, the first CPU 90 eliminates the dial tone. In step 105, the first CPU 90 transfers the telephone number, via the first interface 11 and the second CPU 10, to be displayed on an LCD display 16. In step 106, first CPU 90 checks whether the corresponding telephone number has been completely input. If it has not been completely input, the system returns to step 105, and if the corresponding telephone number has been completely input, it advances to step 107. In step 107, first CPU 90 checks for example whether or not the called party is talking on the telephone in order to determine if the line is busy. If the line is busy, first CPU 90 enables transfer of a busy tone through tone ringer 19 of sub-apparatus 2 to the calling party in step 108. In step 109, first CPU 90 displays a busy line state on the LCD display 16 by controlling second CPU 10 through main subscriber line card 70 and first interface 11. If it is determined in step 107 that the line is not busy, first CPU 90 enables transfer of a ring back tone to calling party in step 110, and then proceeds to step 111. In step 111, first CPU 90 checks whether the called party has registered an absence-message. If the absence-message has not been registered, a "RING" message is displayed on the LCD display 16 in step 112. If the absence-message has been registered in step 111, the registered absence-message is displayed on the LCD display 16 in step 113.

Figure 3:
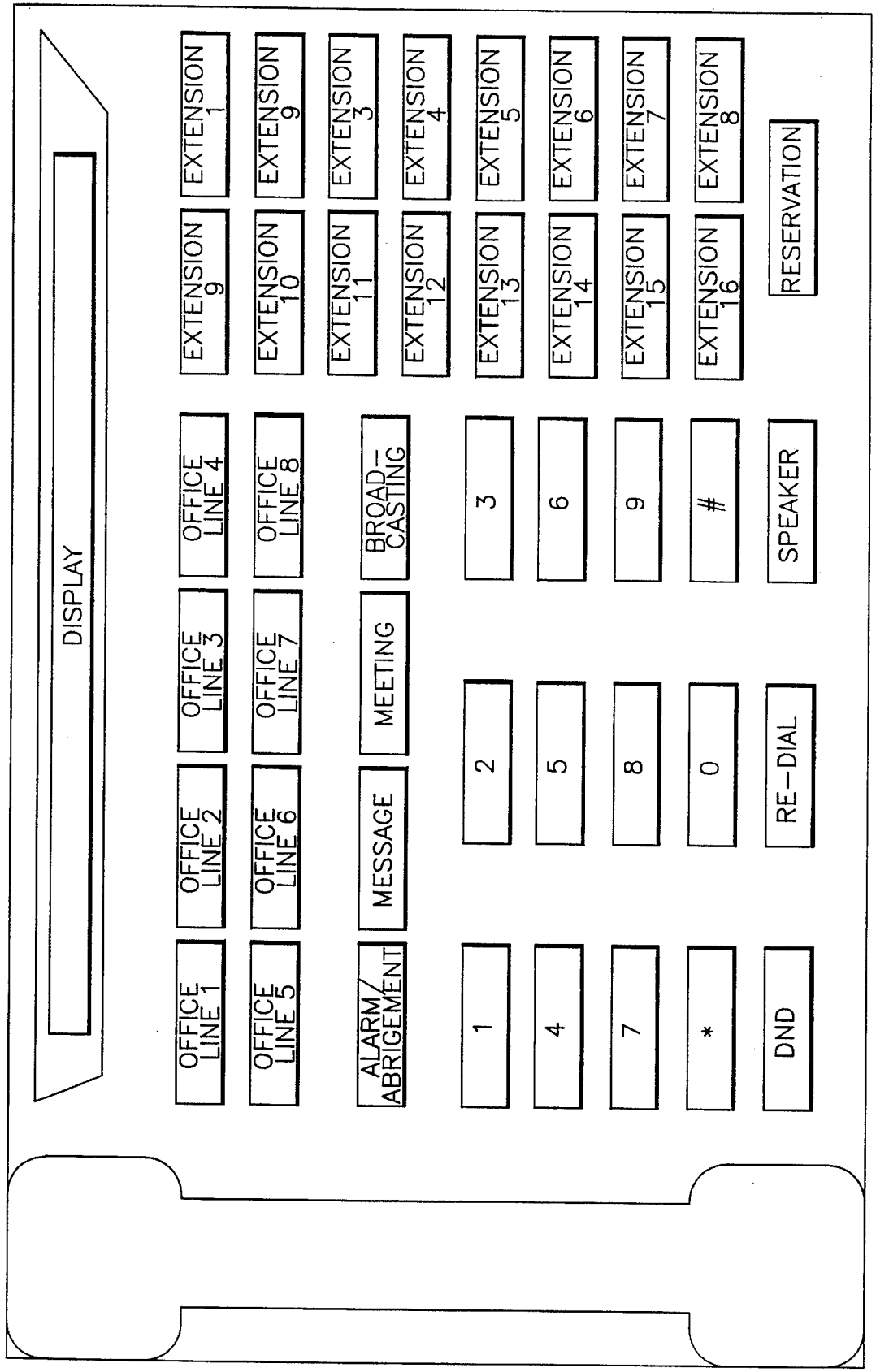
FIG. 3 is a block diagram of the key matrix 15 of FIG. 1 in which a party can make an absence-message by using a telephone.

FIG. 3 is a block diagram of the key matrix 15 in which a party can make an absence-message by using the telephone. This is not related to a conventional MMC (Man Machine Communication) since it is available for use only in a message registration mode. If a party prepares an absence-message using the key matrix 15, the message can be subsequently displayed on the telephone of a calling party.

The following is a detailed description of the present invention which refers specifically to FIGS. 4 through 6. The block diagrams of the keyphone system shown in FIG. 1 however, and the key matrix 15 shown in FIG. 3 also apply to the present invention. Accordingly, reference numbers shown in FIGS. 1 and 3 are also applicable to the following description of the present invention.

Figure 4A:
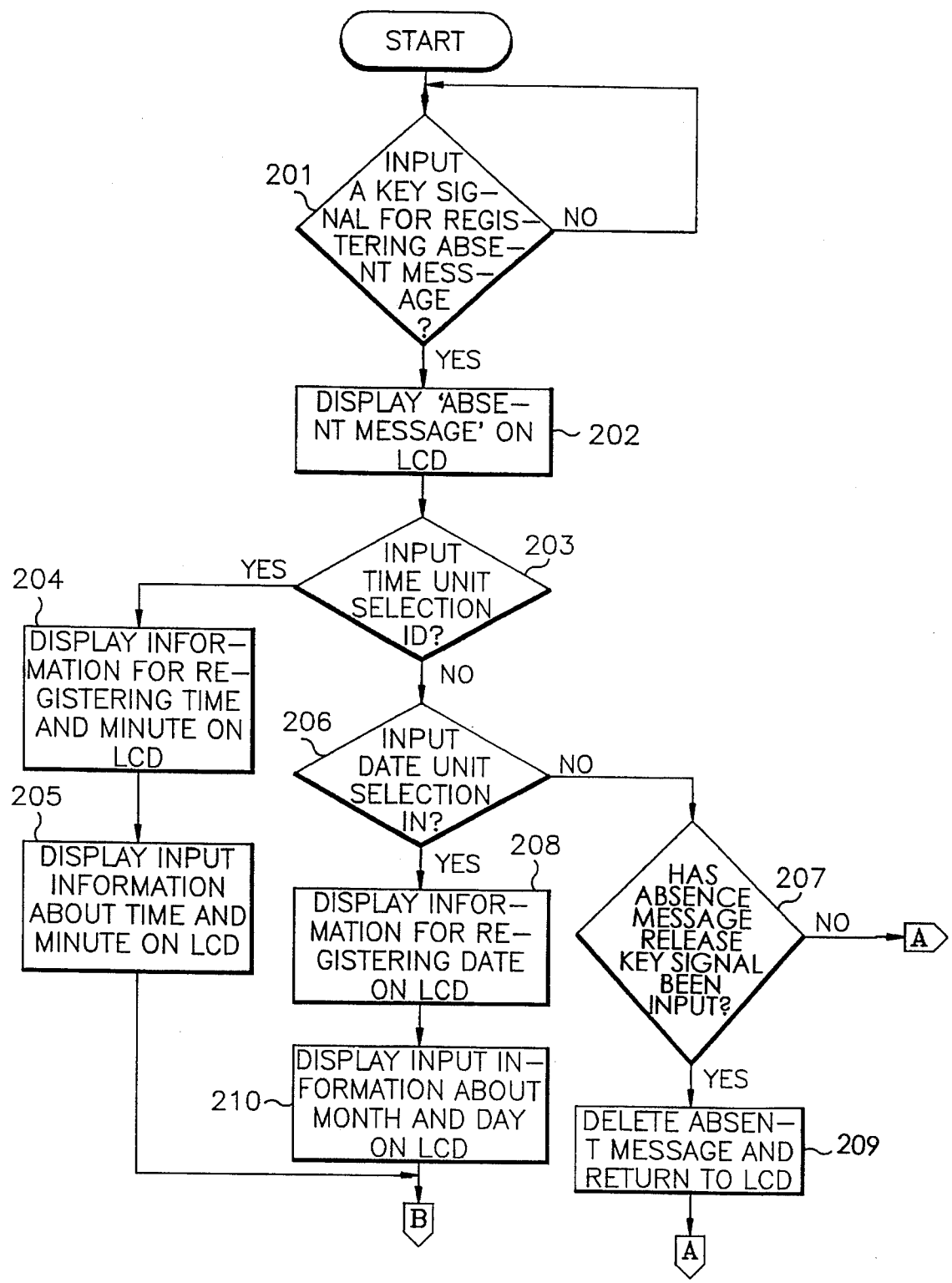
FIGS. 4A and 4B are flow charts showing a method for registering the absence-message according to a first embodiment of the present invention.
Figure 4B:
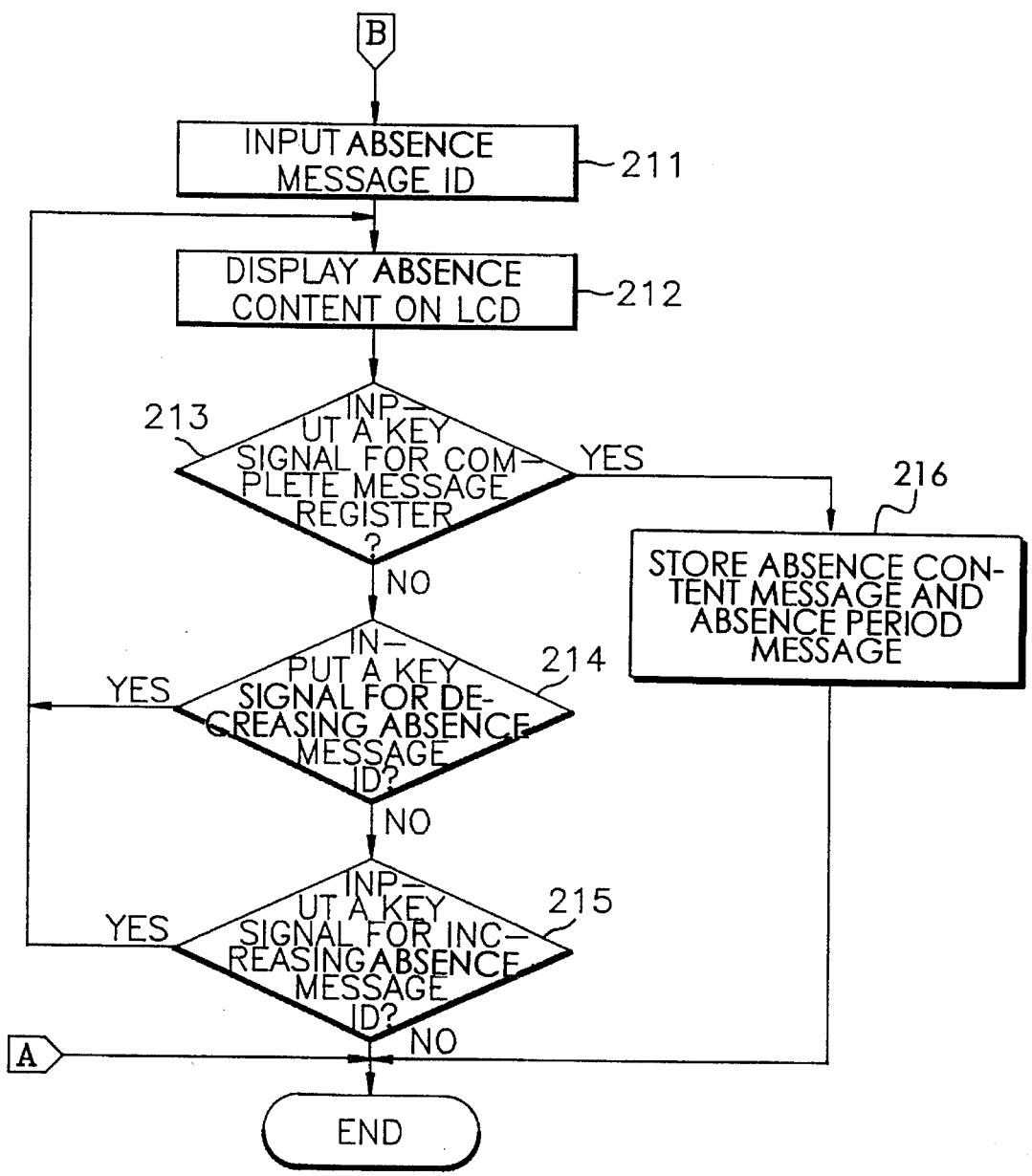
Figure 4C:
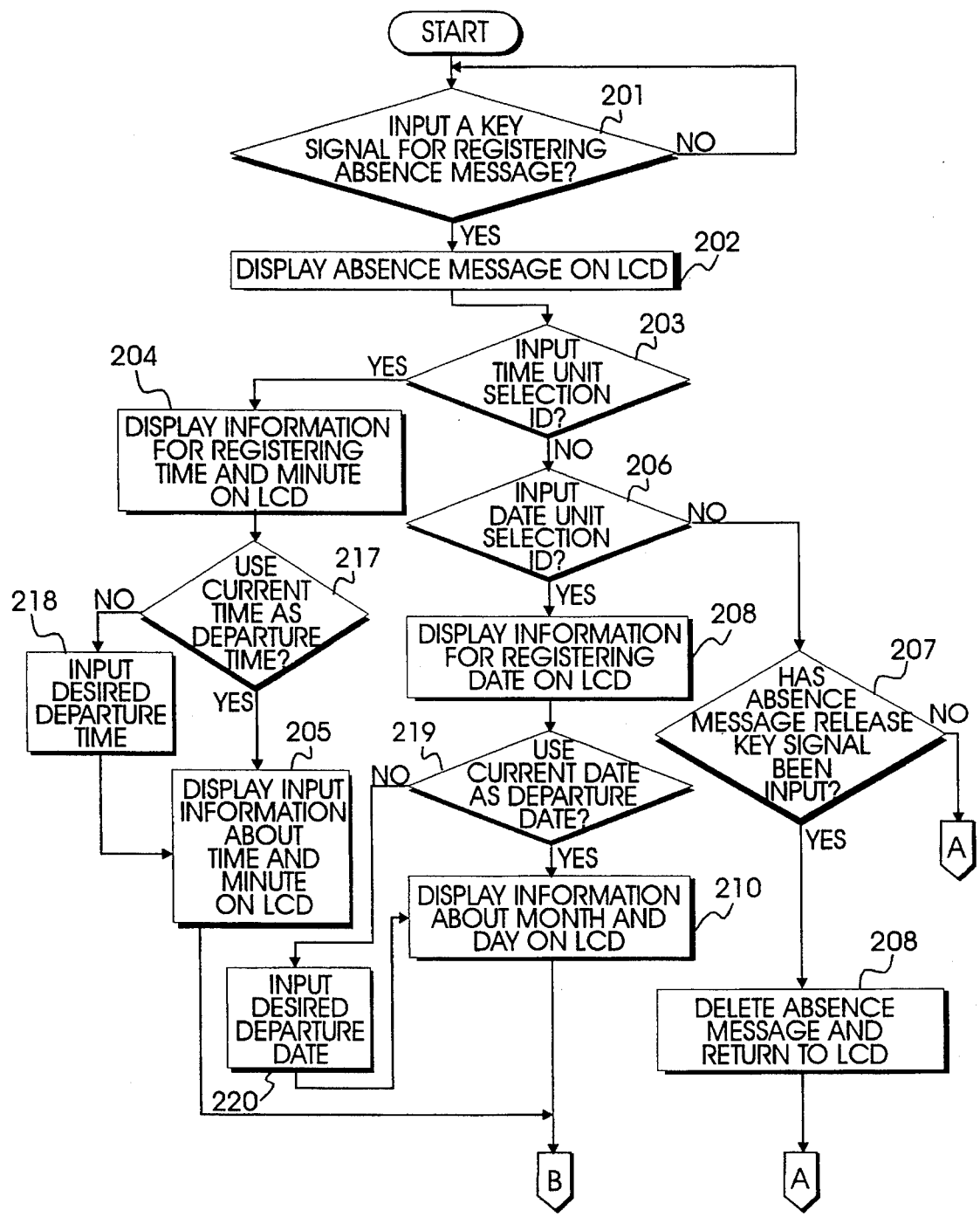
FIG. 4C is a flow chart showing a method for registering the absence message according to a second embodiment of the present invention.

FIG. 4A through 4C are flow charts showing a method for registering an absence-message according to the present invention. The method includes the steps of confirming receipt of a time unit selection ID or a date unit selection ID after receiving a key signal for registering an absence-message, inputting a time or date period of absence and displaying the time or date period on a liquid crystal display (LCD), selecting an absence content message (i.e., the context, or text, of a message so as to inform a caller of the called party's absence) and displaying the message on the LCD, confirming whether the displayed message is to be replaced, correcting the displayed message if it is to be replaced, again confirming whether the new displayed message should be replaced, and storing messages corresponding to the period of absence (time or date) and to the reason for absence when the complete desired messages have been registered.

Figure 5A:
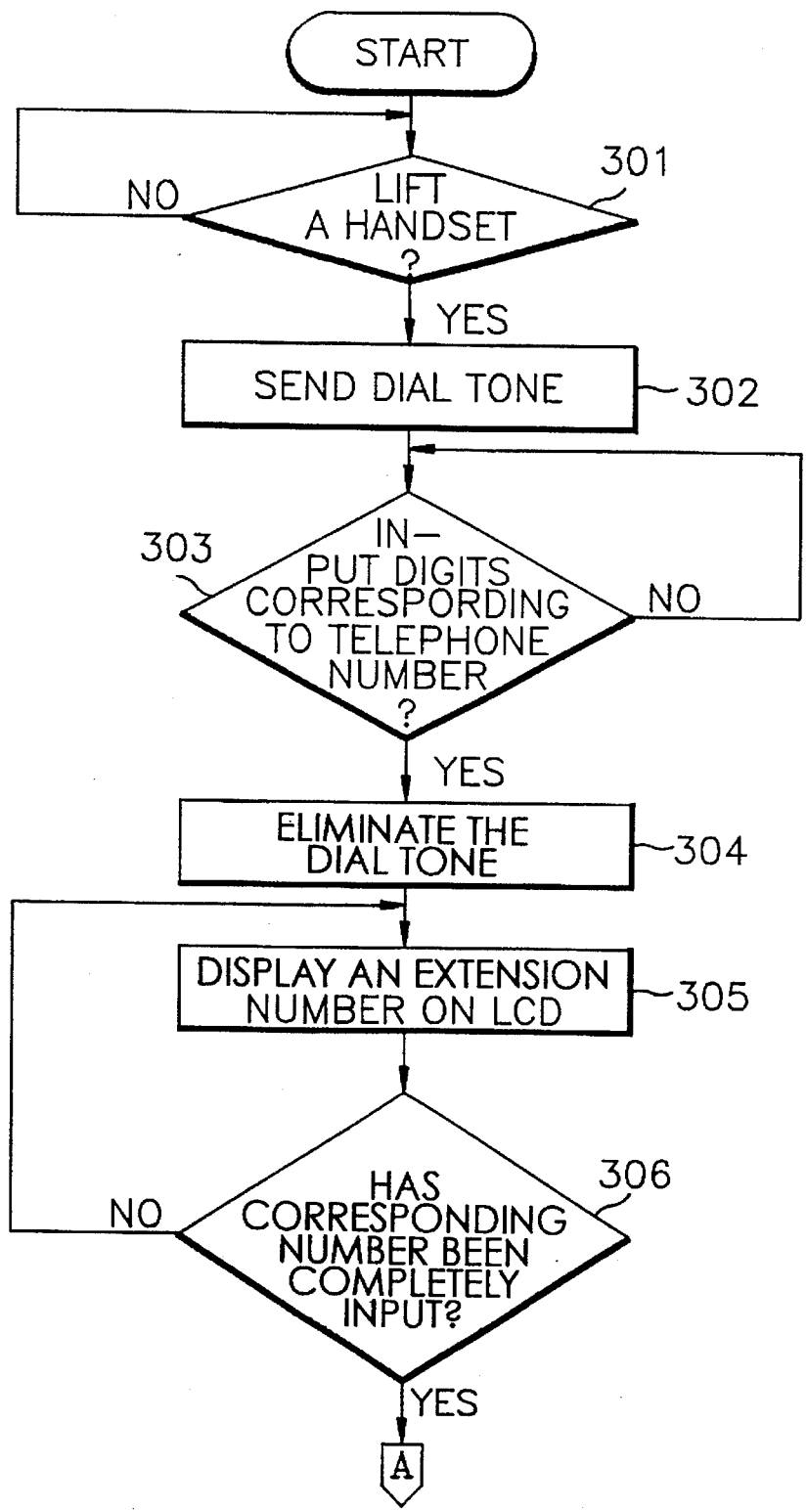
FIGS. 5A and 5B are flow charts showing a method for displaying the absence-message according to the present invention.
Figure 5B:
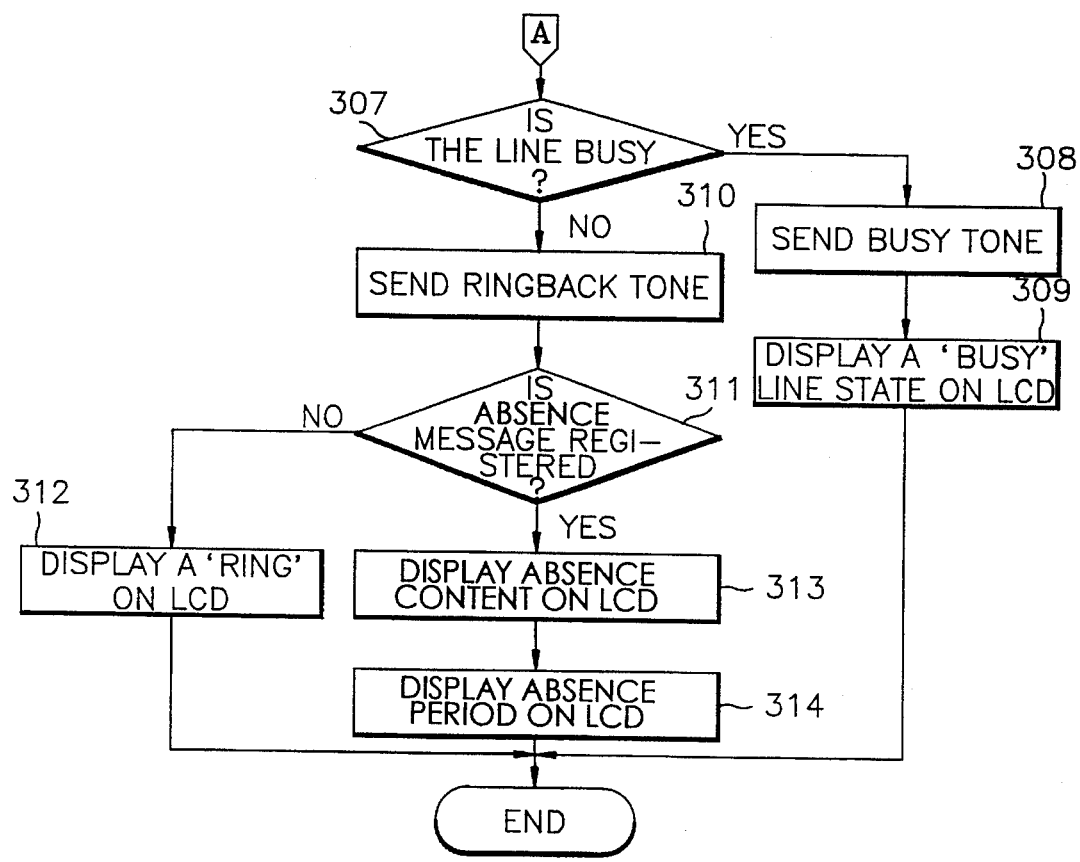

FIGS. 5A and 5B are flow charts showing a method for displaying the absence-message according to the present invention and includes the steps of confirming whether the telephone line of a called party is in a busy state, transmitting a busy tone and displaying a message indicative of a busy line state on the LCD when the called party is talking on the telephone. The method of FIGS. 5A and 5B also include steps of detecting whether or not an absence-message is registered when the called party is not talking on the telephone, transmitting an absence content message and an absence period message to the calling party and displaying the messages on the LCD when the absence message has been registered.

FIG. 6 is a diagram showing the format of the absence message according to the present invention when it is registered on the LCD display.

Referring now to FIGS. 1 through 6, a more detailed description of the preferred embodiment according to the present invention is as follows.

The sub-apparatus 2 of the keyphone system, shown in the FIG. 1, is connected to the main apparatus 1 of the keyphone to transfer and receive control data. The keyphone system controls the sub-apparatus 2 and the main apparatus 1 to provide a continuous speech path for a party talking on an office line. The system achieves this by enabling transmission of the control data between the sub-apparatus 2 and the main apparatus 1. Of the four lines connecting the main apparatus 1 and the sub-apparatus 2, two lines transmit a voice signal and two lines transmit the control data. Therefore, the transfer and reception of control data between main apparatus 1 and sub-apparatus 2 is limited to these two lines.

In the keyphone system, a calling party can be informed of circumstances surrounding a called party's absence when the called party has previously registered an absence message. To register the absence message, a user of the present system utilizes the key matrix 15 of the sub-apparatus 2. First, he presses an absence-message registration key on the key matrix 15, shown in FIG. 3, generating a signal that is applied to the first CPU 90 through the second CPU 10, the first interface 11, the main subscriber line card 70 and the interface circuit 80. In step 201 (see FIG. 4A), the first CPU 90 checks and confirms input of the absence-message registration key. Once confirmed, in step 202, an "ABSENCE MESSAGE" is displayed on an LCD 16, as shown in 51 of FIG. 6. Thereafter, the user presses an ID on key matrix 15 to select an absence period. This produces a signal that is also applied to first CPU 90 through second CPU 10, the first interface 11, main subscriber line card 70 and interface circuit 80. In step 203, the first CPU 90 checks and confirms input of a time unit selection ID (predetermined as a number key 1). Once confirmed, in step 204, LCD display 16 displays information for inputting an hour and a minute, as shown in 52 of the FIG. 6. After displaying this information, the user inputs the time period of his absence, for example from 9:30 to 12:00, by using the number keys on key matrix 15. The system is designed such that the user is only required to input the estimated arrival time. The current time is automatically entered as the departure time, unless specified otherwise by the user (see steps 217 through 220 in FIG. 4C). In step 205, first CPU 90 controls second CPU 10 to display the hours and minutes corresponding to the period of absence on the LCD display 16, as shown in 54 of the FIG. 6.

If in step 203 however, the time unit selection ID is not input, the first CPU 90 proceeds to step 206, to determine whether a date unit selection ID (predetermined as the number key 2) is input. If the date unit selection ID input is confirmed, in step 208, LCD display 16 displays information for a month and day input, as shown in 53 of the FIG. 6. After displaying this information, the user inputs the dates of his absence, for example from Sept. 30 to Oct. 06, by using the number keys of the key matrix 15. Again, the current date is entered out of default as the date of departure, unless the user directs otherwise. In step 210, first CPU 90 controls second CPU 10 to display the dates corresponding to the period of absence on the LCD display 16, as shown in 55 of the FIG. 6. After displaying the hour, minute or date information in steps 205 and 210, the user presses the ID of key matrix 15, as in FIG. 3, for selecting the content of the absence message (predetermined as the number key 3). In step 212, first CPU 90 controls the second CPU 10 to display an absence-content message, chosen from the list shown in table 1, on the LCD display 16, as shown in 56 or 57 of the FIG. 6. That is, if the time unit selection ID is input, a message is displayed as in 56 of FIG. 6 and if the date unit selection ID is input, a message is displayed as in 57 of FIG. 6. Then, when the user confirms that the displayed absence-content and absence-period messages are correct, he presses a message registration complete key. In step 216, first CPU 90 checks whether the message registration complete key has been pressed. If it has been pressed, the first CPU 90 then stores the absence-content and absence-period messages in RAM 101, displays the selected messages on the LED display 16 in the form shown in table 2, and concludes the program. If however, the displayed absence content message is not a desired one, in step 212, the user searches for the message he wants by pressing the "*" or "1" keys shown in FIG. 3. The "*" key decreases the ID number to the previous absence content message and the "1" key increases the ID number to the next absence-content message (see table 1). In steps 214 and 215, the first CPU 90 confirms "*" or "1" inputs to decrease or increase the ID number of the absence-content message, respectively, and then returns to step 212 to display the corresponding absence-content message. For example, if the absence-content message "INTERNAL MEETING" (i.e. ID number 3) is displayed and the "*" key is pressed, the "OFF DUTY DAY" message (i.e. ID number 2) will be displayed, and if the "1" key is pressed, the "OUTSIDE MEETING" message (i.e. ID number 4) will be displayed. Referring back to step 207, first CPU 90 checks whether the absence message release key signal has been input. If the user presses the absence message registration key two times, first CPU 90 recognizes this as the absence message release key signal. Accordingly, if the absence message registration release key signal is input, in step 209, first CPU 90 removes the contents of the current absence message registration table stored in RAM 101, removes the absence message displayed on the LCD display 16 of sub-apparatus 2, and returns to a start state.

TABLE 1

| 0 | VACATION |
| 1 | HOLIDAY |
| 2 | OFF DUTY DAY |
| 3 | INTERNAL MEETING |
| 4 | OUTSIDE MEETING |
| 5 | EDUCATION |
| 6 | REST ROOM |
| 7 | BUSINESS TRIP |
| 8 | HOSPITAL |
| ● | |
| ● | |
| ● | |

TABLE 2

| Subscriber Port No. | absence message ID | time unit | from | to |
| --- | --- | --- | --- | --- |
| 0 | 0 | 2 | 12/24 | 12/31 |
| 1 | 1 | 2 | 12/24 | 12/25 |
| 2 | 2 | 2 | 12/26 | 12/26 |
| 3 | 3 | 1 | 09:30 | 12:00 |
| ● | ● | 1: hour | ● | ● |
| ● | ● | minute | ● | ● |
| ● | ● | 2: month date | ● | ● |

Referring again to the FIGS. 5A and 5B, when one party calls another party who has registered absence-content and absence-period messages as mentioned above, the operations for displaying the absence message are as follows. In step 301, when the calling party lifts the handset 18, the first CPU 90 of the main apparatus 1 receives a hook-off signal through the second interface 12 of the sub-apparatus 2, the main subscriber line card 70 and the interface circuit 80. The first CPU 90 then transfers the hook-off signal to the second CPU 10 through the interface circuit 80, the main subscriber line card 70 and the first interface 11. In step 302, the first CPU 90 then enables transfer of a dial tone to the calling party through the interface circuit 80, the main subscriber line card 70, the first interface 11 and the handset 18. In step 303, the first CPU 90 checks whether digits corresponding to the telephone number of a called party are input by the calling party. If the digits input by the calling party correspond, in step 304, the first CPU 90 eliminates the dial tone. In step 305, first CPU 90 transfers the telephone number, via first interface 11 and second CPU 10, to be displayed on an LCD display 16. In step 306, first CPU 90 checks whether the corresponding telephone number has been completely input. If it has not been completely input, the system returns to step 305, and if it has been completely input, it advances to step 307. In step 307, first CPU 90 checks whether or not the called party is talking on the telephone to determine if the line is busy. If the line is busy, first CPU 90 enables transfer of a busy tone through tone ringer 19 of sub-apparatus 2 to the calling party in step 108. In step 309, first CPU 90 displays a busy line state on LCD display 16 by controlling second CPU 10 through main subscriber line card 70 and the first interface 11. If it is determined in the step 307 that the line is not busy, first CPU 90 enables transfer of a ring back tone to calling party in step 310, and then proceeds to step 311. In step 311, first CPU 90 checks whether the called party has registered an absence-message. If the absence-message has not been registered, a "RING" message is displayed on the LCD display 16 in step 312. If the absence-message has been registered in step 311, the registered absence-content and absence-period messages are displayed on LCD display 16 in steps 313 and 314, respectively. Accordingly, the calling party recognizes why the called party is absent and the period for which he is absent, by viewing the absence content and absence period messages displayed on his keyphone.

As described, the present invention allows a called party subscriber to register an absence message indicating why he or she is absent and the beginning and ending points of the absence (in either a time or date format). It is contemplated under the principles of the present invention that if the message included both a departure time and an estimated return time, the calling party would be more informed as to when the called party may arrive from the context of the called party's term of absence. In the same scenario however, if the registered message indicates that the party will be on the "business trip" from Dec. 15, 1993 to Aug. 15, 1994, the fact that the party is only two days late from a four month trip will aid the caller in deciding when to re-attempting his call. In other words, the inclusion of both a departing and arrival time in an absence message provides a caller with information which is invaluable in estimating when successful contact will be likely. Accordingly, when a caller calls a party that has registered an absence-message, the caller is informed as to the reason for the absence, when the party departed and when arrival is expected. Through use of the disclosed system and method, the inconvenience and guesswork associated with attempting to contact an absent party can be reduced.

While there has been illustrated and described what is considered to be the preferred embodiment of the present invention, it will be understood by those skilled in the art that various changes and modifications may be made, and equivalents may be substituted for elements thereof without departing from the true color and scope of the present invention.

What is claimed is:

1. A method for displaying an absence-message in a private exchange system, comprising the steps of:

determining whether said absence-message provided by a called subscriber has been previously registered in a memory when a telephone corresponding to said called subscriber is called by a calling subscriber, said absence-message being comprised of an absence content-message and an absence-period message, said absence-content message indicating why said called subscriber is absent and said absence-period message indicating a beginning point and an ending point of said called subscriber's absence; and transmitting said absence-content message and said absence-period message to said calling subscriber via said exchange system and displaying said absence-content message and said absence-period message on a variable visual display of a telephone corresponding to said calling subscriber when it is determined that said absence-message has been previously registered in said memory by said called subscriber, and displaying on said variable visual display of said telephone corresponding to said calling subscriber a message indicating that said telephone corresponding to said called subscriber is ringing when it is determined that said absence-message has not been previously registered in said memory by said called subscriber.

2. The method as claimed in claim 1, further comprised of said beginning point and said ending point of said called subscriber's absence being expressed in one of hours and minutes and months and days in dependence upon said called subscriber's selection when registering said absence message.

3. The method as claimed in claim 1, further comprised of said determining step comprising the steps of:

confirming whether said called subscriber is talking on said telephone corresponding to said called subscriber;

transmitting a busy tone to said telephone corresponding to said calling subscriber and displaying a busy line state message on said variable visual display of said telephone corresponding to said calling subscriber when said called subscriber is talking on said telephone corresponding to said called subscriber; and performing said step of determining whether said absence-message has been previously registered by said called subscriber when said called subscriber is not talking on said telephone corresponding to said called subscriber.

4. A method for displaying an absence-message in a private exchange system having a variable visual display, comprising the steps of:

determining whether said absence-message of a called subscriber has been previously registered in a memory by said called subscriber when a telephone of said called subscriber is called by a calling subscriber, said absence-message being comprised of an absence-content message and an absence-period message, said absence-content message indicating why said called subscriber is absent from said telephone of said called subscriber and said absence-period message indicating a beginning point and an ending point of said called subscriber's absence, said beginning point and said ending point of said called subscriber's absence being expressed in one of hours and minutes and months and days in dependence upon said called subscriber's selection when registering said absence-message in said memory; and transmitting said absence-content message and said absence-period message to said calling subscriber via said exchange system and displaying said absence-content message and said absence-period message on said variable visual display of a telephone of said calling subscriber when it is determined that said absence-message has been previously registered in said memory by said called subscriber, and displaying on said variable visual display of said telephone of said calling subscriber a message indicating that said telephone of said called subscriber is ringing when it is determined that said absence-message has not been previously registered in said memory by said called subscriber.

5. The method as claimed in claim 4, further comprised of said determining step comprising steps of:

confirming whether said called subscriber is talking on said telephone of said called subscriber;

transmitting a busy tone to said calling subscriber via said exchange system and displaying a busy line state message on said variable visual display of said telephone of said calling subscriber when said called subscriber is talking on said telephone of said called subscriber; and performing said step of determining whether said absence-message has been previously registered by said called subscriber when said called subscriber is not talking on said telephone of said called subscriber.

6. A method for registering an absence-message in a private exchange system, comprising the steps of:

inputting a first key on a telephone terminal within said system to enable a subscriber to register said absence-message comprised of an absence period message and an absence content message;

registering said absence period message indicating a beginning point and an ending point of said subscriber's absence by inputting said ending point of said subscriber's absence, said system automatically providing a current time as said beginning point of said subscriber's absence unless said subscriber directs otherwise; and registering said absence content message indicating why said subscriber is going to be absent after said registering of said absence period message by selecting said absence content message via key input, said registering of said absence period message and said absence content message being performed while said telephone terminal is in an absence-message registration mode.

7. The method as claimed in claim 6, further comprising the steps of:

determining whether a registered absence-message is a desired message;

storing said registered absence-message if said registered absence-message is desired; and replacing said registered absence-message if said registered absence-message is not desired.

8. The method as claimed in claim 6, further comprised of said beginning point and said ending point of said subscriber's absence being expressed in either hours and minutes or months and days in dependence upon said subscriber's desire when registering said absence period message.

9. The method as claimed in claim 6, further comprised of said step of registering said absence period message comprising the steps of:

inputting one of a time unit selection key and a date unit selection key after inputting said first key that enables registration of said absence message; and displaying absence period information indicative of said absence period message on a variable visual display of said telephone terminal.

10. The method as claimed in claim 9, further comprised of said time unit selection key being input when said absence period message is to be expressed in units of hours and minutes.

11. The method as claimed in claim 9, further comprised of said date unit selection key being input when said absence period message is to be expressed in units of months and days.

12. A method for registering an absence-message in a private exchange system, comprising the steps of:

inputting a first key on a telephone within said system to enable a subscriber to register said absence-message, said absence-message being comprised of an absence period message and an absence content message, said absence content message indicating why said subscriber is going to be absent and said absence-period message indicating a beginning point and an ending point of said subscriber's absence;

after inputting said first key, inputting one of a time unit selection key and a date unit selection key on said telephone to indicate a format in which said absence-period message will be expressed;

inputting said ending point of said subscriber's absence, said telephone automatically designating one of a current time and a current date as said beginning point of said subscriber's absence unless an input representative of said beginning point is provided;

displaying said absence-period message on a variable visual display of said telephone;

after displaying said absence-period message, selecting said absence-content message via key input and displaying said absence-content message on said variable visual display of said telephone;

confirming that said absence-period message and said absence-content message being displayed are desired messages; and storing said absence-period message and said absence-content message as selected messages.

13. The method as claimed in claim 12, further comprising a step of correcting said absence period message and said absence content message being displayed if they are not desired messages, and then returning to said step of confirming that said absence period message and said absence content message being displayed are desired messages.

14. The method as claimed in claim 12, further comprised of said time unit selection key being input when said absence period message is to be expressed in hours and minutes.

15. The method as claimed in claim 12, further comprised of said date unit selection key being input when said absence period message is to be expressed in months and days.

16. The method as claimed in claim 12, further comprised of said beginning point and said ending point of said subscriber's absence being expressed in units of hours and minutes when said time unit selection key is input, and being alternatively expressed in units of months and days when said data unit selection key is input.

17. The method as claimed in claim 12, further comprising a step of providing input of a second key to delete said absence-period message and said absence-content message being displayed when said absence-period message and said absence-content message being displayed are not desired messages.

18. The method as claimed in claim 1, further comprising the steps of:

detecting, prior to said determining step, whether said telephone corresponding to said called subscriber exhibits a busy state; and displaying, on said variable visual display of said telephone corresponding to said calling subscriber, a busy message indicating that said telephone corresponding to said called subscriber is exhibiting said busy state when it is detected that said telephone corresponding to said called subscriber exhibits said busy state.

19. The method as claimed in claim 4, further comprising the steps of:

detecting, prior to said determining step, whether said telephone of said called subscriber exhibits a busy state; and displaying, on said variable visual display of said telephone of said calling subscriber, a busy message indicating that said telephone of said called subscriber is exhibiting said busy state when it is detected that said telephone of said called subscriber exhibits said busy state.

* * * * *